US007394360B2

(12) United States Patent
Derbel

(10) Patent No.: US 7,394,360 B2
(45) Date of Patent: Jul. 1, 2008

(54) METHOD FOR COMMISSIONING RADIO-BASED EMERGENCY ALARM SYSTEMS

(75) Inventor: Faouzi Derbel, München (DE)

(73) Assignee: Siemens Aktiengesellschaft, Munich (DE)

( * ) Notice: Subject to any disclaimer, the term of this patent is extended or adjusted under 35 U.S.C. 154(b) by 81 days.

(21) Appl. No.: 11/249,071

(22) Filed: Oct. 12, 2005

(65) Prior Publication Data

US 2006/0077054 A1 Apr. 13, 2006

(30) Foreign Application Priority Data

Oct. 12, 2004 (DE) ...................... 10 2004 049 704

(51) Int. Cl.
*G08B 1/08* (2006.01)
*G08B 9/00* (2006.01)
*H04M 11/00* (2006.01)

(52) U.S. Cl. .............................. 340/539.1; 340/286.01; 455/404.1

(58) Field of Classification Search ...................... None
See application file for complete search history.

(56) References Cited

U.S. PATENT DOCUMENTS 6,678,750 B2 * 1/2004 Meade et al. .................. 710/7
2004/0203388 A1 * 10/2004 Henry et al. ............... 455/41.2
2006/0116160 A1 * 6/2006 Fuccello .................. 455/556.1
2006/0195552 A1 * 8/2006 Nampei ...................... 709/218

FOREIGN PATENT DOCUMENTS

| | | |
|---|---|---|
| EP | 0 833 288 B1 | 4/1998 |
| EP | 1 282 094 A2 | 2/2003 |
| FR | 2855298 | 5/2003 |
| WO | 00/21053 | 4/2000 |
| WO | WO 01/15112 A1 | 3/2001 |

* cited by examiner

*Primary Examiner*—Julie Bichngoc Lieu
(74) *Attorney, Agent, or Firm*—Baker Botts L.L.P.

(57) ABSTRACT

In a method for commissioning radio-based emergency alarm systems, having a master station (7) with a transmit and receive arrangement and peripheral elements (1 to 6), each also having a transmit and receive arrangement, in a cell, the peripheral elements are fitted and supplied with energy, whereupon they transmit search telegrams and then switch to receive mode. Peripheral elements (1 . . . 6), which receive a search telegram from a search peripheral element (1 . . . 6) while in receive mode, transmit a response telegram to the searching peripheral element (1 . . . 6). The availability tables of the peripheral elements (1 . . . 6) in mutual contact with each other are then supplemented and a structure is thereby automatically created among the already fitted peripheral elements (1 . . . 6).

18 Claims, 1 Drawing Sheet

METHOD FOR COMMISSIONING RADIO-BASED EMERGENCY ALARM SYSTEMS

CROSS-REFERENCE TO RELATED APPLICATIONS

This application claims priority from German Patent Application No. 10 2004 049 704.4, which was filed on Oct. 12, 2004, and is incorporated herein by reference in its entirety.

TECHNICAL FIELD

The invention relates to a method for commissioning radio-based emergency alarm systems, having a master station with a transmit and receive arrangement and peripheral elements, each also having a transmit and receive arrangement, in a cell of the emergency alarm system.

BACKGROUND

Emergency alarm systems, in which messages are transmitted by radio, offer the user many advantages. The emergency alarm systems thereby comprise monitoring sensors as peripheral elements, which if an emergency situation, e.g. fire or an intruder, is detected, transmit an emergency alarm message via a radio link to a center or master station (to be understood as repeaters), where further measures such as an alarm message to the fire service or police are initiated to eliminate the emergency.

A method for radio transmission in an emergency alarm unit is known from EP 833288, in which measured data can be transmitted from a monitoring sensor to the central unit via further monitoring sensors acting as intermediate stations, if a direct radio link to the center does not exist or fails due to inadequate range. A permanent hierarchical link structure is provided for the monitoring sensors for this purpose.

A method for radio transmission in an emergency alarm system is known from EP 1282094, which operates by means of repeaters but is still economical in respect of power, so that battery operation is possible. The receive arrangements are thereby activated cyclically at predefined times and users that are ready to transmit send a preamble, which results in the users provided for receive purposes remaining activated until the end of the entire preamble once they start to receive and being deactivated again, if no preamble is received. A time is transmitted in the preamble, at which the receiver re-activates to receive the actual data telegram.

The commissioning of such radio-based emergency alarm systems differs from the commissioning of wire-based units. In the case of radio-based emergency alarm systems, the wire present in principle in electrically linked units is not present to act as the first addressing element. In the case of small radio systems, as generally used in private alarm technology, assembly and commissioning are generally carried out by the same person. In the case of large systems, in other words in industrial units, it is desirable to separate these two actions for cost reasons. This is because it has proven economical for an operator, who does not require a profound knowledge of the often complicated electronic system, to fit the equipment first without commissioning the system. The actual commissioning is carried out in a second stage by a trained technician. To this end the central element (gateway or master station) is first switched to so-called register mode. The individual alarm monitors are then registered successively with the gateway. Once all the alarm monitors in a cell have been registered in this fashion, register mode is terminated. This can take place manually or automatically after a specified time or when the cell is full. The problem here is that the person carrying out the registration operation has to handle every monitor. This takes a long time in the case of large units specifically. The commissioning operator may also have to climb ladders to set the individual alarm monitors or to activate the energy supply to the alarm monitors.

SUMMARY

The object of the invention is therefore to specify a method for commissioning radio-based emergency alarm systems, which allows more economical and faster commissioning.

The object can be achieved by a method for commissioning radio-based emergency alarm systems, having a master station, which comprises a transmit and receive arrangement, and peripheral elements, each comprising a transmit and receive arrangement, the method comprising the steps of:

- mounting the peripheral elements and supplying them with energy,
- the peripheral elements repeatedly transmitting a search telegram at predefined time intervals,
- the peripheral elements switching to receive mode after transmitting the search telegram,
- the peripheral elements or the master station, which receive a search telegram from a searching peripheral element in receive mode, transmitting a response telegram to the searching peripheral element,
- the searching and responding peripheral elements or the master station inputting the respective other peripheral element or the master station as available in their own availability tables,
- the peripheral elements transmitting search telegrams until the master station can be accessed directly or via other peripheral elements as intermediate stations.

In the method according to the invention the peripheral elements, e.g. the alarm monitors, are first fitted and supplied with energy, the latter for example being achieved by the insertion of batteries. The untrained fitter therefore puts the alarm monitors in position. Next the peripheral elements output search telegrams repeatedly at predefined time intervals and then switch to a receive mode. Those peripheral elements receiving a search telegram from a searching peripheral element while in receive mode send a response telegram to the searching peripheral element. The two communicating peripheral elements input themselves respectively in their own availability tables, thereby forming a cluster, which communicates within itself. The peripheral elements thereby organize themselves without the master station transmitting a register prompt. Only when the master station does transmit a register prompt, do all the peripheral elements that have received the register prompt register with the master station and update their respective availability tables.

In an advantageous embodiment of the method, the peripheral elements with direct contact with the master station inform the other peripheral elements of this availability of the master station. This ensures that all the peripheral elements in the cell are in contact with the master station, in some instances via peripheral elements operating as intermediate stations, and commissioning is completed.

Another embodiment advantageously provides for the master station to optimize the cell structure once all the peripheral elements have successfully registered and to transmit routing lists to the peripheral elements, showing the path via which the peripheral elements are to communicate with the master station.

In yet another embodiment, the availability table held advantageously comprises one line in the case of peripheral elements in direct communication with the master station, with a character in the line for every peripheral element that is in contact with this selected peripheral element. This results in a particularly simple embodiment of the availability table.

In a further embodiment of the method, the availability table comprises two lines in the case of peripheral elements that communicate with the master station via a peripheral element operating as an intermediate station, with a character in one of the lines for every peripheral element with which the selected peripheral element is in direct contact and a character in the second line for the peripheral element used by the selected peripheral element as an intermediate station for accessing the master station.

By increasing the time intervals between individual search telegrams it is possible to increase the life of the battery at the start of a fitting operation. During this period significant transmit activity is unsuccessful.

As soon as the peripheral element receives response telegrams, the time intervals between the search telegrams are advantageously reduced, to achieve an operational emergency alarm system as quickly as possible, once a master station is identified in the cell.

After being fitted and supplied with energy, the master station can thereby first transmit a search telegram to all peripheral elements and evaluate the response telegrams received. The active path thereby results in faster commissioning.

Also, after being fitted and supplied with energy, the master station can switch to receive mode first and respond to the search telegrams of the peripheral elements. This will interfere less with the autonomous organization of the peripheral elements.

BRIEF DESCRIPTION OF THE DRAWINGS

The invention is described in more detail below based on an exemplary embodiment with reference to the figures, in which.

DETAILED DESCRIPTION

Figure 1:
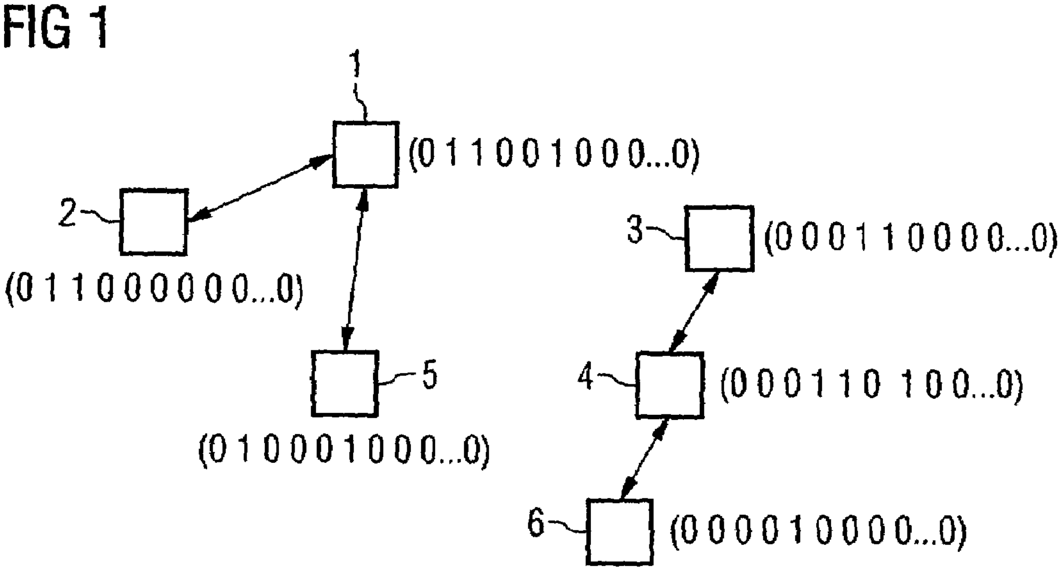
FIG. 1 shows schematic diagram of an emergency alarm system with peripheral elements, before the master station has output a register prompt

FIG. 1 shows a schematic diagram of a total of six peripheral elements 1 to 6 as parts of an emergency alarm system. The peripheral elements 1 to 6 can be alarm monitors (e.g. fire and intrusion monitors) or even operating elements or signal units. Every peripheral element 1 to 6 respectively has a transmit and receive arrangement (not shown) for communication with each other and with a master station (not shown). The individual peripheral elements are commissioned immediately after fitting, when the fitter inserts and connects the batteries. At this point the peripheral elements 1 to 6 do not know whether other peripheral elements 1 to 6 and the master station 7 (see FIG. 2) are ready to operate. A searching peripheral element (e.g. 1) then transmits a search telegram with a length of for example 250 ms with the content: can anyone hear me and route me to the master station with a specific ID, for example zero. The searching peripheral element then switches to receive, for example for short time intervals every 200 ms. The searching peripheral element 1 tries to query at different time intervals whether another peripheral element (e.g. 2 to 6) is in proximity to it. If one of the peripheral elements 2 to 6 in proximity responds to the search telegram, the searching peripheral element 1 queries whether the responding peripheral element (e.g. 2) represents a standard peripheral element or the master station. If the peripheral element 1 ascertains that further peripheral elements 2 to 5 are present but no master station 7 in the network has as yet been identified in the cell, the searching peripheral element 1 tries to register with the master station 7 with a transmit telegram at increasing time intervals. The increasing time intervals, e.g. 10 min, 1 h, 4 h, increase the life of the battery. If during the start of fitting there are only a few peripheral elements 1 . . . 6 in the cell, the significant transmit activity would otherwise consume energy but with no additional information content as a result. When a master station 7 is discovered, the peripheral element tries to make contact with other peripheral elements at shorter time intervals.

As soon as the master station 7 has been installed, it tries to identify which peripheral elements 1 to 6 can establish contact with the master station 7. For this purpose the master station 7 can start to transmit broadcast messages, which convey its presence to the peripheral elements 1 . . . 6 or the master station 7 is in receive mode first and notifies searching peripheral elements 1 . . . 6 of its presence in the response telegram. The active mode of immediate transmission of a telegram by the master station 7 is thereby the path to be preferred, as it accelerates the commissioning procedure. The peripheral elements in direct contact with the master station 7 (in FIG. 2 the peripheral elements 5 and 6), synchronize themselves with the master station and input this in their availability tables. The peripheral elements 5 and 6 in direct contact with the master station 7 also transmit this information to the peripheral elements, which are not linked directly to the master station 7, but only to peripheral elements 5 and 6 operating as intermediate stations. The entire network is established in this fashion in the cell of the emergency alarm system and every peripheral element 1 to 6 thereby learns by which path the master station 7 and therefore an emergency alarm center 8 can be accessed.

As soon as the master station 7 knows a complete network topology, the master station 7 tries to address all the peripheral elements 1 . . . 6 for control purposes and awaits an acknowledge signal.

After the commissioning procedure for the peripheral elements, the master station optimizes the network topology, for which purpose the cluster heads, which are the peripheral elements operating as intermediate stations (in the exemplary embodiment the peripheral elements 5 and 6) can be distributed and individual routing lists can be transposed. The routing lists are then transmitted via the peripheral elements 5 and 6 operating as intermediate stations to all the peripheral elements 1 to 6.

Figure 2:
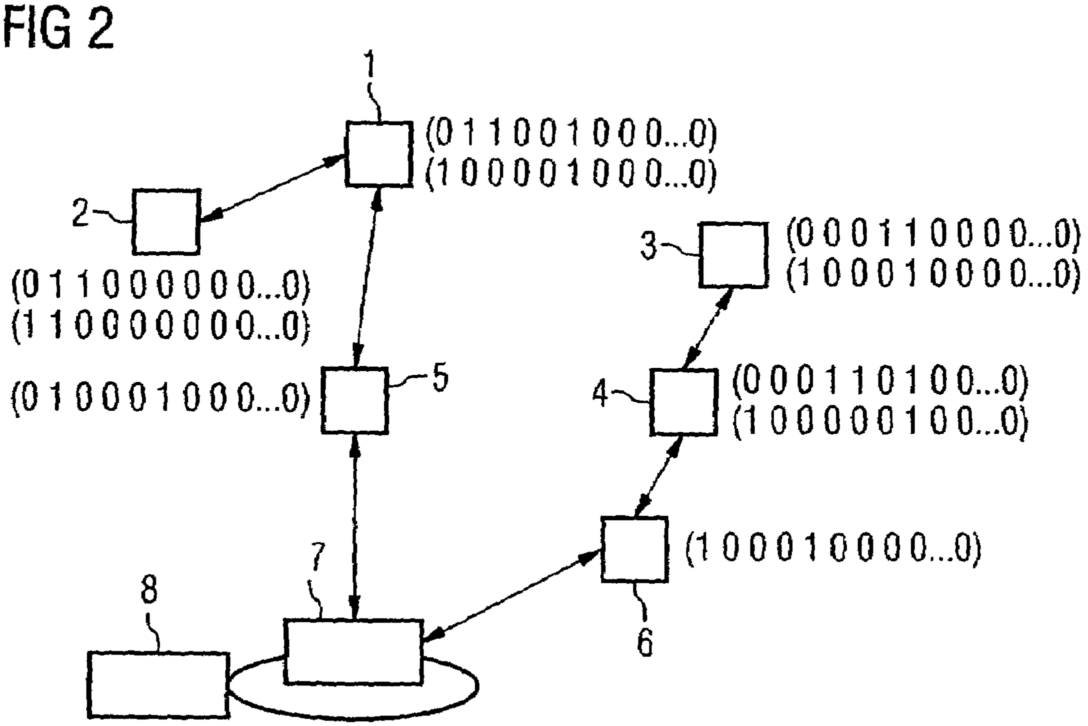
FIG. 2 shows a schematic diagram of an emergency alarm system and the master station, after the emergency alarm system has been commissioned.

The availability tables shown in FIGS. 1 and 2 are read as follows: the position in the line indicates the ID of the respective peripheral element, with the master station 7 being input at position zero. For example the peripheral element 1 in FIG. 1 communicates directly with the peripheral element 2 and the peripheral element 5, i.e. a one respectively and otherwise a zero are input at positions 1, 2 and 5. After commissioning there are two different types of peripheral elements in the cell: on the one hand those peripheral elements (e.g. 5 and 6) directly linked to the master station 7. The availability table of such peripheral elements 5 and 6 has only one line, in which there is a one at all the points representing the peripheral elements or the master station, with which these peripheral elements 5 and 6 are in direct contact. For example the peripheral element 6 communicates directly with the master station 7 and with the peripheral element 4, so that there is a one at the positions zero and four respectively. There are also peripheral elements (1, 2, 3, 4) which are not in direct contact with the master station 7 but communicate via respective intermediate stations with the master station 7. The availability tables of these peripheral elements comprise two lines. One of the lines (in FIG. 2 the upper line) indicates the peripheral elements with which the respective peripheral element is in direct contact, for example the peripheral element 1 communicates directly with the peripheral elements 2 and 5. The second line indicates the peripheral element via which the master station is accessed. In the example the peripheral element 1 accesses the master station 7 via the peripheral element 5, i.e. there is a one or otherwise zero at the positions 0 and 5 respectively. In this fashion the cell structure of the emergency alarm system is represented in full in the availability tables of the peripheral elements.

The method according to the invention allows the fitter to commission the peripheral elements for example by inserting and connecting the batteries, without requiring subsequent commissioning by a service engineer. The peripheral elements are able to establish a network among themselves and to discover the presence of a master station 7 for the commissioning of the emergency alarm system and to use the cell structure for commissioning purposes.

What is claimed is:

1. A method for commissioning radio-based emergency alarm systems, having a master station, which comprises a transmit and receive arrangement, and peripheral elements, each comprising a transmit and receive arrangement, the method comprising the steps of:

mounting the peripheral elements and supplying them with energy, the peripheral elements repeatedly transmitting a search telegram at predefined time intervals, the peripheral elements switching to receive mode after transmitting the search telegram, the peripheral elements or the master station, which receive a search telegram from a searching peripheral element in receive mode, transmitting a response telegram to the searching peripheral element, the searching and responding peripheral elements or the master station inputting the respective other peripheral element or the master station as available in their own availability tables, the peripheral elements transmitting search telegrams until the master station is accessed directly or via other peripheral elements as intermediate stations.

2. A method for commissioning a radio-based emergency alarm system according to claim 1, wherein the peripheral elements in contact with the master station transmit the availability of the master station to the peripheral elements, with which they are in contact.

3. A method for commissioning a radio-based emergency alarm system according to claim 1, wherein the master station optimizes the cell structure and transmits routing lists to the peripheral elements.

4. A method for commissioning a radio-based emergency alarm system according to claim 1, wherein the availability table comprises one line for peripheral elements which communicate directly with the master station and a character is input in the line for every directly available peripheral element.

5. A method for commissioning a radio-based emergency alarm system according to claim 1, wherein the availability table comprises two lines for peripheral elements which communicate with the master station via a peripheral element operating as an intermediate station and a character is input in one of the two lines for every directly available peripheral element and in the other position of the two lines for the peripheral element operating as an intermediate station for the master station.

6. A method for commissioning a radio-based emergency alarm system according to claim 1, wherein the peripheral elements increase the time intervals between search telegrams, if no response telegrams are received.

7. A method for commissioning a radio-based emergency alarm system according to claim 1, wherein the peripheral elements reduce the time intervals between individual search telegrams, as soon as response telegrams are received.

8. A method for commissioning a radio-based emergency alarm system according to claim 1, wherein after fitting and after energy has been supplied, the master station first transmits a search telegram to all peripheral elements and then waits for response telegrams.

9. A method for commissioning a radio-based emergency alarm system according to claim 1, wherein, after fitting and after energy has been supplied, the master station first waits in receive mode for search telegrams and then transmits a response telegram.

10. A radio-based emergency alarm system, comprising:

a master station, which comprises a transmit and receive arrangement, and peripheral elements, each comprising a transmit and receive arrangement, and means for supplying the peripheral elements with energy, wherein the system is designed in such a way that:

the peripheral elements repeatedly transmit a search telegram at predefined time intervals, the peripheral elements switch to receive mode after transmitting the search telegram, the peripheral elements or the master station, which receive a search telegram from a searching peripheral element in receive mode, transmit a response telegram to the searching peripheral element, the searching and responding peripheral elements or the master station input the respective other peripheral element or the master station as available in their own availability tables, the peripheral elements transmit search telegrams until the master station is accessed directly or via other peripheral elements as intermediate stations.

11. A system according to claim 10, wherein the peripheral elements in contact with the master station transmit the availability of the master station to the peripheral elements, with which they are in contact.

12. A system according to claim 10, wherein the master station optimizes the cell structure and transmits routing lists to the peripheral elements.

13. A system according to claim 10, wherein the availability table comprises one line for peripheral elements which communicate directly with the master station and a character is input in the line for every directly available peripheral element.

14. A system according to claim 10, wherein the availability table comprises two lines for peripheral elements which communicate with the master station via a peripheral element operating as an intermediate station and a character is input in one of the two lines for every directly available peripheral element and in the other position of the two lines for the peripheral element operating as an intermediate station for the master station.

15. A system according to claim 10, wherein the peripheral elements increase the time intervals between search telegrams, if no response telegrams are received.

16. A system according to claim 10, wherein the peripheral elements reduce the time intervals between individual search telegrams, as soon as response telegrams are received.

17. A system according to claim 10, wherein after energy has been supplied, the master station first transmits a search telegram to all peripheral elements and then waits for response telegrams.

18. A system according to claim 10, wherein, after energy has been supplied, the master station first waits in receive mode for search telegrams and then transmits a response telegram.

* * * * *